United States Patent [19]
Dew

[11] Patent Number: 5,592,775
[45] Date of Patent: Jan. 14, 1997

[54] PACKAGE FOR SPROUTS

[76] Inventor: Diana Dew, 17671-133rd Way N., Jupiter, Fla. 33478

[21] Appl. No.: 589,524

[22] Filed: Jan. 22, 1996

[51] Int. Cl.⁶ .................................................. A01G 31/00
[52] U.S. Cl. .................................... 47/61; 47/60; 206/423
[58] Field of Search ............................ 47/61 SG, 60 NL; 206/423

[56] References Cited

U.S. PATENT DOCUMENTS

| | | | |
|---|---|---|---|
| 1,929,490 | 10/1933 | Golden . | |
| 3,992,810 | 11/1976 | Kimball | 47/85 |
| 4,057,932 | 11/1977 | Spencer | 47/85 |
| 4,249,341 | 2/1981 | Huegli | 47/61 |
| 4,313,542 | 2/1982 | Roberts | 206/611 |
| 4,396,115 | 8/1983 | Watson | 206/44 |
| 4,628,697 | 12/1986 | Brack | 62/89 |
| 4,787,172 | 11/1989 | Lee | 47/16 |

*Primary Examiner*—Henry E. Raduazo
*Attorney, Agent, or Firm*—Alvin S. Blum

[57] ABSTRACT

A molded plastic sheet has many rectangular sprout growing trays joined together at top peripheral flanges. Each tray has drainage holes and a bottom sloping to the holes. A sheet of many trays may grow sprouts in preproportioned amounts. The flanges are divided by partially cut through lines for separation after growing. A transparent clamshell container receives the tray and holds it in place by the flange when closed The container has a front portion and a rear portion joined by a hinge, with rectangular perimeters which snap sealingly together. The lower part of the container holds the tray. It is sealed water tight. Above that part, one or more ventilation passages are provided in the container sides so that the sprouts may continue to grow while on retail display. A hanging tab is provided on the container top with an easy opening adjacent flap.

12 Claims, 4 Drawing Sheets

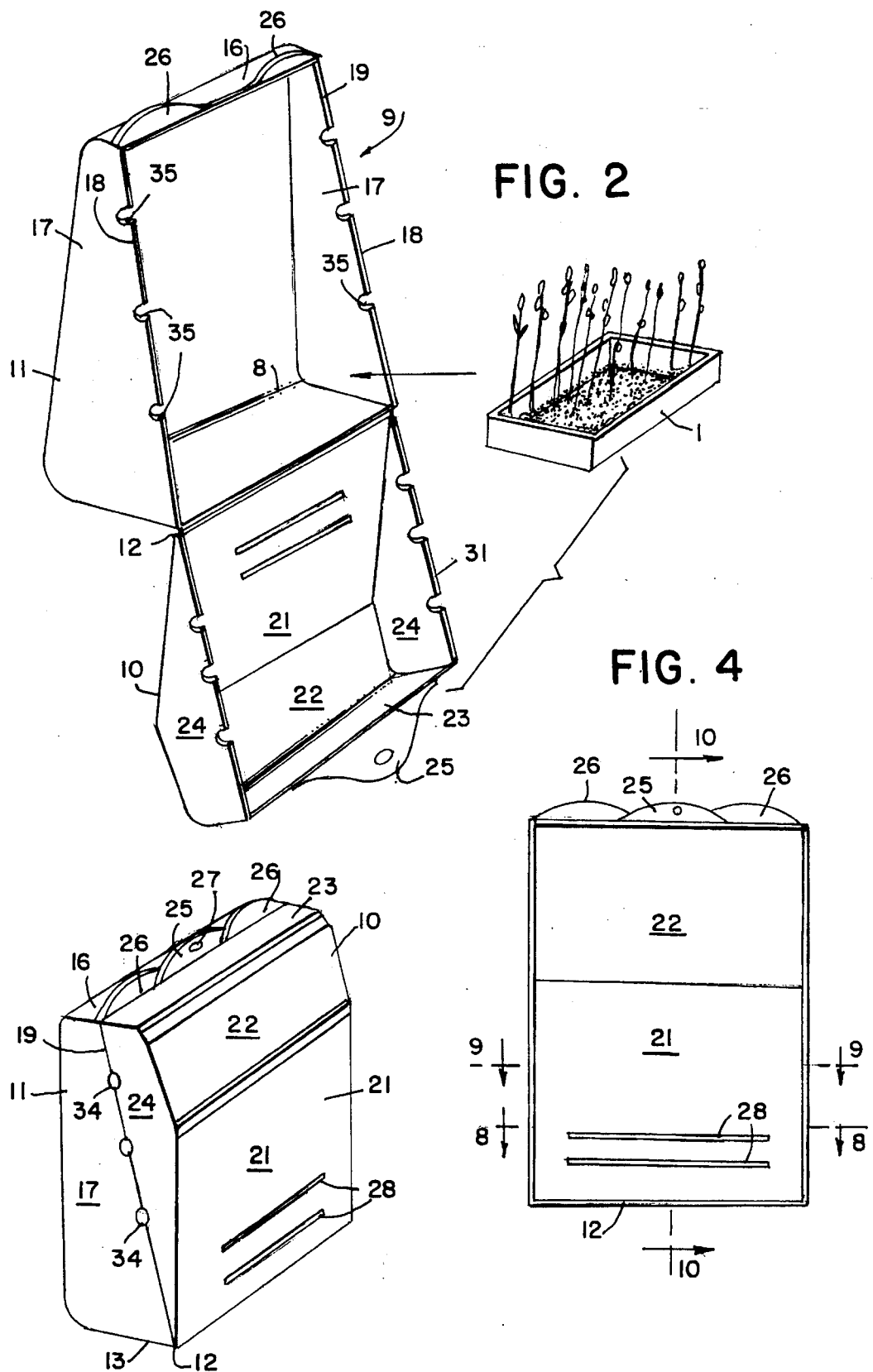

5,592,775

PACKAGE FOR SPROUTS

TECHNICAL FIELD

The present invention relates to packages, and, more particularly, to a molded package system for the production, transport and display of living and growing small plants, especially sprouts.

BACKGROUND OF THE INVENTION

Although bean sprouts have always been a popular food item in the orient, recent dietary changes have now made a variety of sprouts very popular grocery store items, including, for example, alfalfa, wheatgrass, sunflower and snowpea. Usual practice is to grow the sprouts in large, shallow trays. The resulting sprouts with a mat of roots is divided into portions, and each portion is inserted into a transparent, closed package for shipment and retail display. The portioning is labor intensive and inconsistent. Another usual practice grows the sprouts in individual trays. A separate transparent top portion snaps onto the bottom tray to complete the package. The individual trays are provided with bottom perforations so that irrigating water can enter and drain during the growing phase. Perforations on the package are essential to permit air exchange so that the plants will remain healthy and growing for extended shelf life and freshness. Unfortunately, perforations in the lower portion of the package permit entrance of contaminated materials. Display tables in grocery stores are often sprayed with water, which can carry unpleasant and even dangerous materials into the product. There is no easy indicator of contamination of this sort.

A packaging system that would be more sanitary while permitting growing in portions would be safer, less labor intensive and less expensive.

SUMMARY OF THE INVENTION

It is, accordingly, an object of the invention to provide a packaging system that permits the growing of the sprouts in separated portions with adequate means for the entrance and drainage of water during the growing phase and that provides a. transparent molded enclosure with adequate, ventilated headroom and a water impermeable lower portion during transport and display. It is another object that the package provide enough air and light to enable further growth after packaging. It is yet another object that the package contents be clearly visible when displayed by hanging or standing on a surface.

The package of the invention comprises a molded transparent "clamshell" container comprising a front half and a back half molded together in one piece with a hinge between the halves. The edges of the two halves are provided with snap-and-lock- together ridges well known in the art to provide a water tight seal. The sealing edges are not continuous all along the perimeter. A plurality of gaps are provided in the sealing edges above the lower portion to ensure adequate ventilation of the contents while sealing the bottom portion. The package is adapted to receive the plant material directly or in a separate growing tray.

These and other objects, advantages and features of the invention will become more apparent when the detailed description is studied in conjunction with the drawings in which like reference characters refer to like elements in the various figures.

BRIEF DESCRIPTION OF THE DRAWINGS

FIG. 1 is a perspective view of the closed package of the invention, without contents.

FIG. 2 is a perspective view of the opened package with a tray of sprouts ready for insertion.

FIG. 4 is a front elevation view of the closed, empty package.

DETAILED DESCRIPTION OF PREFERRED EMBODIMENTS

Figure 10:
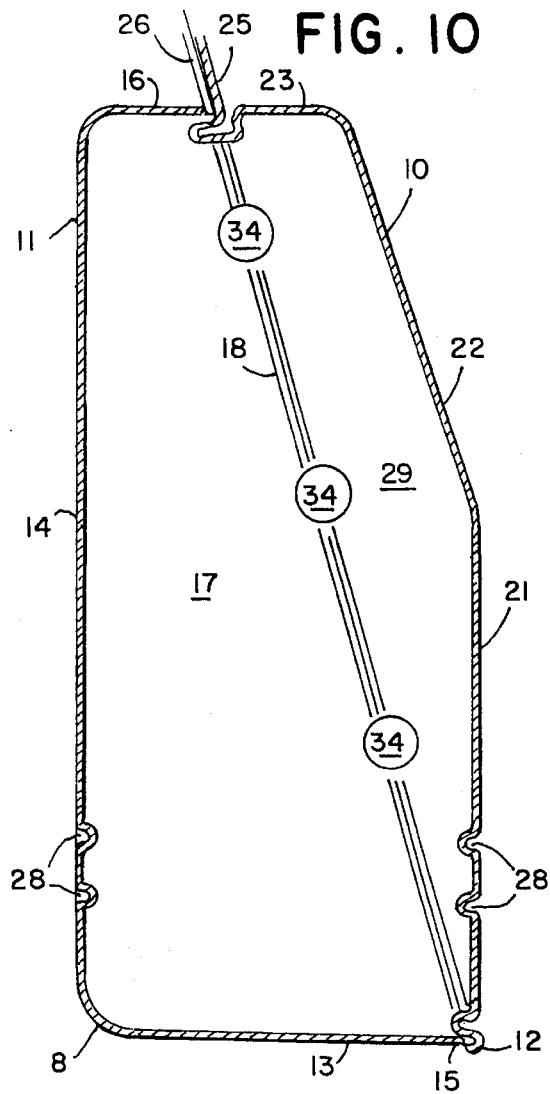
FIG. 10 is a sectional view taken on line 10—10 of FIG. 4.
Figure 3:
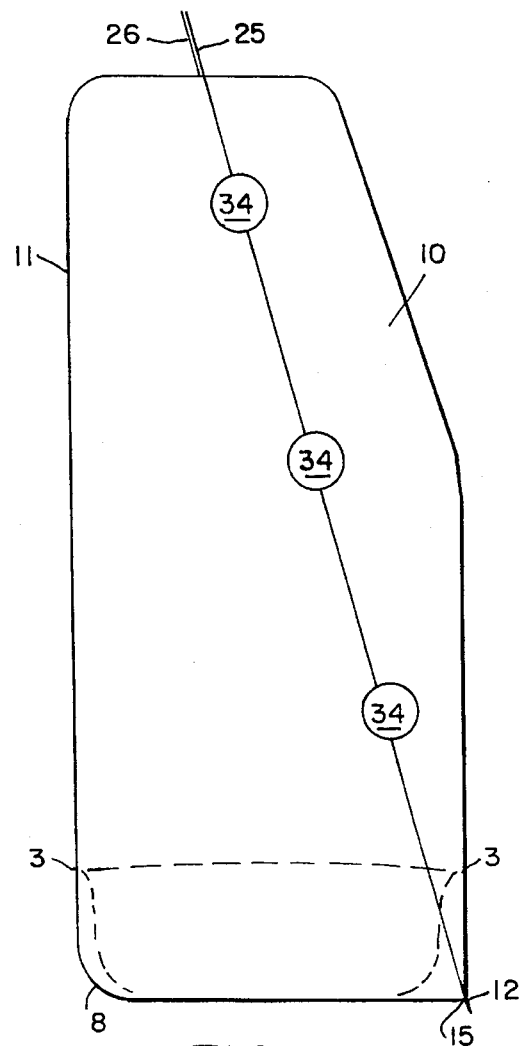
FIG. 3 is a side elevation view of the closed package with contents in phantom.
Figure 5:
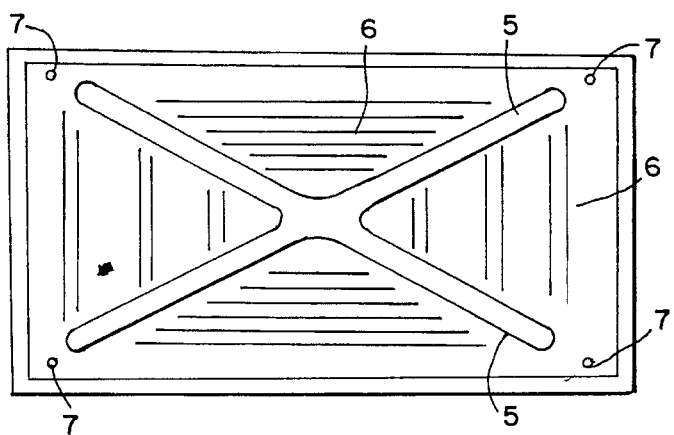
FIG. 5 is a top view of a separated tray of the invention.
Figure 6:
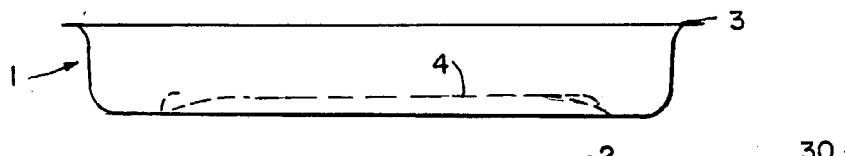
FIG. 6 is a side view of the tray of FIG. 5.
Figure 7:
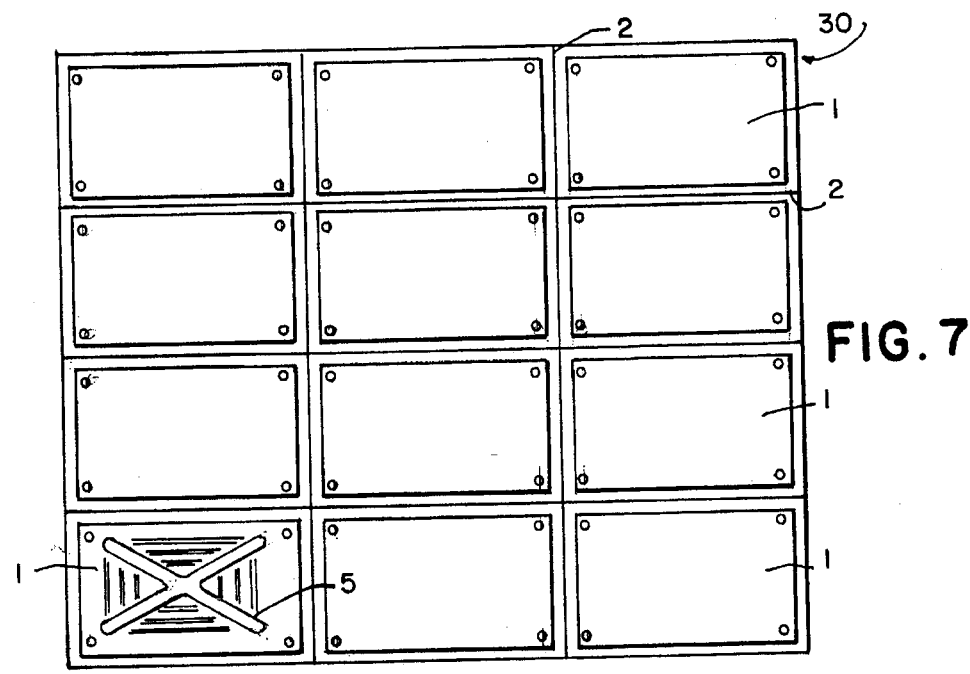
FIG. 7 is a top view of a sheet of trays before separation into individual trays.
Figure 8:
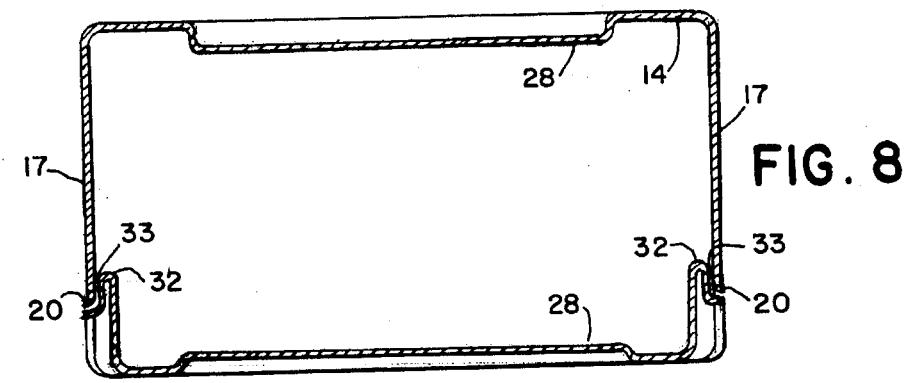
FIG. 8 is a sectional view taken on line 8—8 of FIG. 4.
Figure 9:
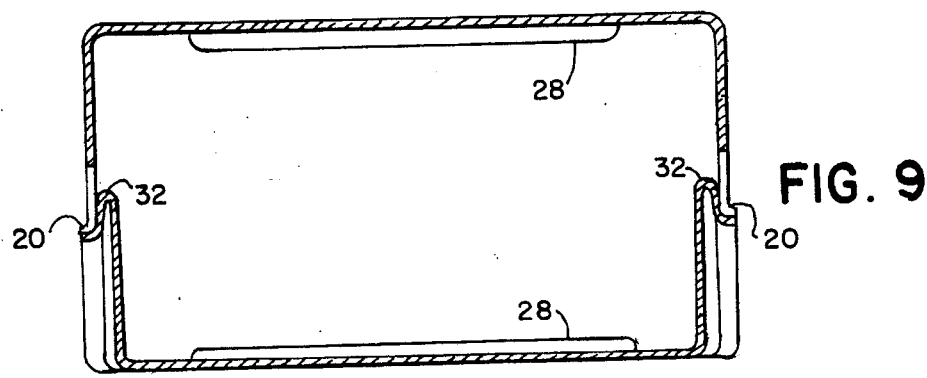
FIG. 9 is a sectional view taken on line 9—9 of FIG. 4.

Referring now first to FIGS. 2, 3, 5, 6 and 7, a thin food grade plastic sheet 30, is thermoformed into a plurality of individual growing trays 1 held together by partially cut through margins 2. The entire sheet of trays 30 may be handled as a unit during the process of growing plants such as sprouts from seeds to greatly reduce labor costs. When the plants have reached market size, the individual trays may be readily separated by tearing apart manually or mechanically by means well known in the art. This ensures that each portion will hold a uniform amount of sprouts. When the sprouts are grown in large trays and then manually apportioned, there is much random variance in portions. To avoid short weighting, the average portion must be increased, which is a considerable expense in the prior art.

The tray 1, after separation, has perimetral flange 3. The tray has an upwardly extending dome shaped bottom 4 with ridges 5 to prevent the bottom from bulging outward. Corrugations 6 further rigidify the bottom. Drain holes 7 ensure that there will be proper drainage between watering cycles.

Referring now to FIGS. 1–4 and 8–10, a container 9 of the type generally referred to as "clamshell" is thermoformed of a transparent, food grade plastic sheet that is very thin. The thickness of the sheet is greatly exaggerated in the sectional views for illustrative purposes. Corrugations and other rigidizing elements, not shown, as are well known in the art, may be incorporated as desired. The container 9 comprises a front portion 10 and a rear portion 11 held together by hinge 12. The rear portion has a rectangular horizontal bottom panel 13 with a rear edge 8 and a front edge 15. Extending upward from the rear edge 8 is a rectangular vertical panel 14. Extending forward from the top of the vertical panel 14 is a rectangular top panel 16. Two side panels 17 join together the top panel, the bottom panel, and the vertical panel at three edges of each trapezium shaped side panel. The fourth edge 18 of each side panel is a diagonal extending from the forward edge of the top panel to the forward edge of the bottom panel. The entire perimeter 19 of the rear portion has a flange 20. At the top panel, this flange is enlarged to form two tabs 26, which facilitate opening the container.

The front portion 10 comprises a rectangular vertical wall 21 connected at its lower margin to the front edge of the bottom panel by hinge 12, the vertical wall is not as high as the vertical panel. It is joined at its upper margin by the inclined wall 22 which slopes backward to meet, at its upper margin, the horizontal, rectangular top wall 23. Extending from the rear margin of the top wall 23 is opening flap 25 which cooperates with tabs 26 to provide an easy opening mechanism when they are forced apart. An aperture 27 in flap 25 provides for hanging the container in a display.

Side walls 29 join the top, inclined and vertical walls on three of their four margins. The fourth margin extends diagonally from the bottom of the vertical wall to the rear margin of the top wall.

A pair of parallel, inwardly directed, horizontal ridges 28 in both the vertical panel 14 and the vertical wall 10 are arranged to engage the flange 3 of the tray and prevent its displacement should the container be inverted. Two ridges are provided to engage trays of different depths.

The rear portion 11 has a substantially rectangular perimeter 19 and the front portion 10 has a substantially rectangular perimeter 31. In a manner well known in the art, the perimeter 31 is provided with an inwardly directed, encircling ridge 32 which is adapted to sealingly engage the inner wall 33 of the perimeter 19.

Three gaps 34 in the sealing engagement are provided along each diagonal side of the perimeters. These are in the form of three semicircles 35 in each diagonal margin to thereby form three circular passages 34 through the closed sides of the container. These ensure adequate ventilation of the living and growing plants within, so that growth may continue and rotting of the contents can be avoided. All of these ventilation passages are above the level of the tray, so that the water tight edge sealing will not be comprised at lower levels. In many public display areas on produce counters, water may accumulate on the counters. If the lower levels of the container were not sealed, water could enter the package and then the trays through the drainage holes. This would contaminate the product.

By putting one or more ventilation holes on the sides, the visibility through the front of the container is undisturbed. This method of molding in ventilation holes on the sides is better suited to the thermoforming process. Punching transverse holes after molding would be awkward and costly.

Figure 11:
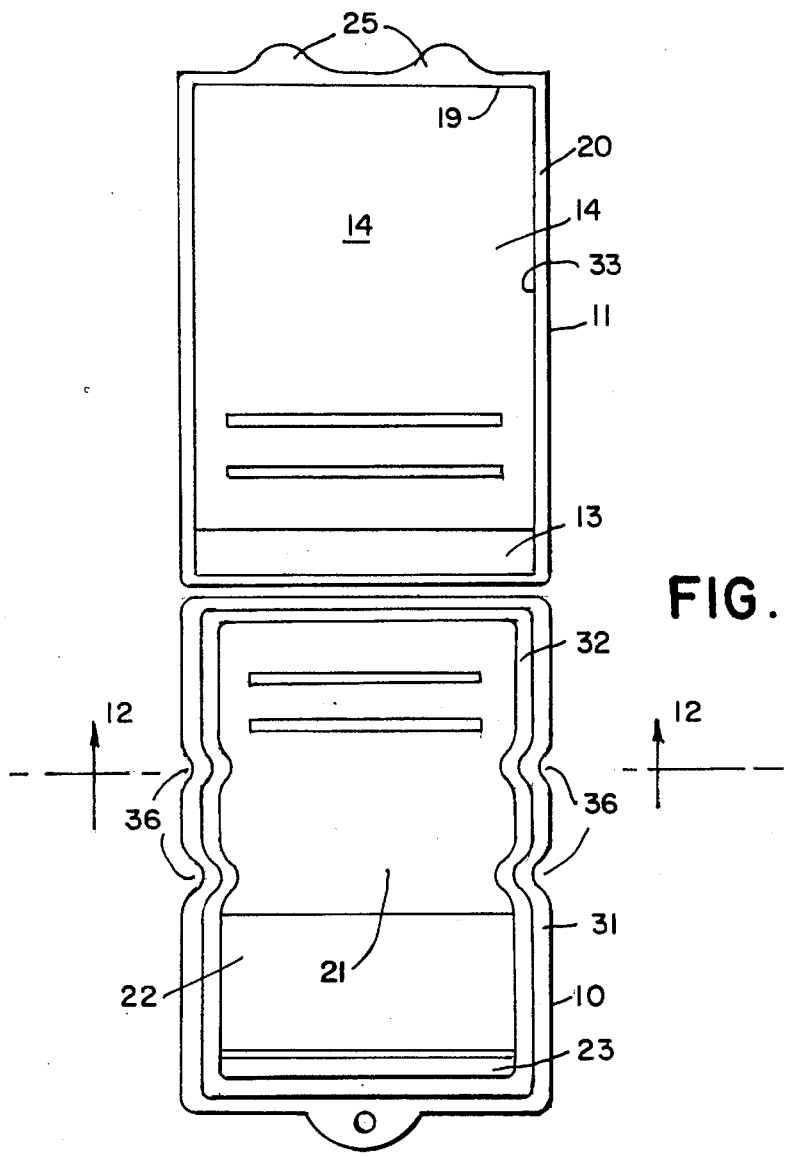
FIG. 11 is a top view of the open container of another embodiment of the invention.
Figure 12:
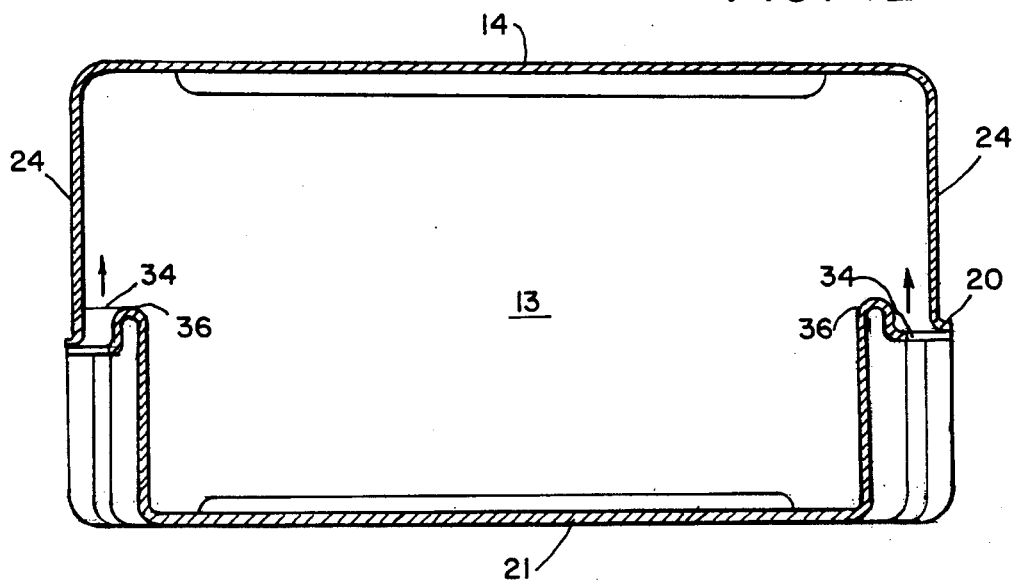
FIG. 12 is a sectional view taken through line 12—12 of FIG. 11 with container closed.

Referring now to FIGS. 11 and 12, another embodiment of the invention provides the sealing perimeters 19 and 31 of rear and front portions 11 and 10 respectively with side ventilating passages 34 by another structure. The sealing ridge 32 at the perimeter 31 is provided with two inwardly directed indentations 36 on each side wall 24 which prevent sealing to the inner surface 53 of perimeter 19. This provides the ventilation passage 34 while maintaining the entire cut edges of the container in a common plane for easier manufacture.

As shown in FIG. 11, the container may optionally be made in two pieces.

The above disclosed invention has a number of particular features which should preferably be employed in combination although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention within the scope of the appended claims.

What is claimed is:

1. A system for containing sprouts comprising a one piece transparent container comprising:
   1) a rear portion comprising:
      a) a horizontal bottom panel forming a base for resting the container on a support surface;
      b) a vertical back panel joined to the bottom panel and extending upward therefrom;
      c) a horizontal top panel joined to the back panel and extending forward therefrom;
      d) first and second side panels joining the bottom, back and top panels at three edges thereof and having an unjoined fourth edge extending diagonally from the top panel to the bottom panel; and
      e) a rectangular perimeter;
   2) a front portion comprising:
      a) a horizontal top wall;
      b) a vertical front wall of a lesser height than the back panel;
      c) a sloping wall connecting the top wall to the front wall;
      d) first and second side walls joining the top, sloping and front walls at three margins thereof and having an unjoined fourth margin extending diagonally from the top wall to the front wall; and
      e) a rectangular perimeter;
   3) a hinge means for hingedly joining the front portion to the rear portion;
   4) the perimeters of the front and rear portions provided with sealing means for coacting and sealingly locking the portions together when the perimeters are forced together; and
   5) at least one ventilating passage formed in at least one of the unjoined fourth edges of the side panels and the unjoined fourth margins of the side walls, the at least one ventilating passage positioned above the lower portion of the container so that the lower portion of the container, when closed, will be impervious to liquid.

2. The system according to claim 1 further comprising:
   at least one horizontally disposed indentation in the back panel extending forward therefrom; and
   at least one horizontally disposed indentation in the front wall extending rearward therefrom;
   the indentations positioned above the lower portion of the container and adapted for coacting to restrain movement of sprouts contained therein when the container is inverted.

3. The system according to claim 2 further comprising a sprout growing tray having a substantially rectangular configuration, a top peripheral flange, a bottom provided with drainage apertures and a configuration sloping downward to the drainage apertures, the tray adapted to grow sprouts therein and to be contained in the lower portion of the container for transport and marketing after growing the sprouts, and the flange being adapted to coact with the indentations to restrain movement of the tray when the container is inverted.

4. The system according to claim 3, in which the tray is provided in the form of an integral molded sheet comprising a plurality of trays joined at the flanges so that the sprouts may be grown in a plurality of combined trays simultaneously for ease of handling.

5. The system according to claim 4, in which the sheet is provided with partially cut through divisions between the flanges to facilitate separation of the individual trays for insertion into the containers.

6. The system according to claim 5 further comprising a hanging tab extending upward from the top of one of the rear portion or the front portion and an easy-opening flap extending upward from the top of the other of the rear portion or the front portion, the tab and the flap positioned beside one another to thereby facilitate grasping to pull the front and rear portions apart.

7. A system for containing sprouts comprising a transparent container comprising:

1) a rear portion comprising:
   a) a horizontal bottom panel forming a base for resting the container on a support surface;
   b) a vertical back panel joined to the bottom panel and extending upward therefrom;
   c) a horizontal top panel joined to the back panel and extending forward therefrom;
   d) first and second side panels joining the bottom, back and top panels at three edges thereof and having an unjoined fourth edge extending diagonally from the top panel to the bottom panel; and
   e) a rectangular perimeter;

2) a front portion comprising:
   a) a horizontal top wall;
   b) a vertical front wall of a lesser height than the back panel;
   c) a sloping wall connecting the top wall to the front wall;
   d) first and second side walls joining the top, sloping and front walls at three margins thereof and having an unjoined fourth margin extending diagonally from the top wall to the front wall; and
   e) a rectangular perimeter;

3) the perimeters of the front and rear portions provided with sealing means for coacting and sealingly locking the portions together when the perimeters are forced together; and 4) at least one ventilating passage formed in at least one of the unjoined fourth edges of the side panels and the unjoined fourth margins of the side walls, the at least one ventilating passage positioned above the lower portion of the container so that the lower portion of the container, when closed, will be impervious to liquid.

8. The system according to claim 7 further comprising:
   at least one horizontally disposed indentation in the back panel extending forward therefrom; and
   at least one horizontally disposed indentation in the front wall extending rearward therefrom;
   the indentations positioned above the lower portion of the container and adapted for coacting to restrain movement of sprouts contained therein when the container is inverted.

9. The system according to claim 8 further comprising a sprout growing tray having a substantially rectangular configuration, a top peripheral flange, a bottom provided with drainage apertures and a configuration sloping downward to the drainage apertures, the tray adapted to grow sprouts therein and to be contained in the lower portion of the container for transport and marketing after growing the sprouts, and the flange being adapted to coact with the indentations to restrain movement of the tray when the container is inverted.

10. The system according to claim 9, in which the tray is provided in the form of an integral molded sheet comprising a plurality of trays joined at the flanges so that the sprouts may be grown in a plurality of combined trays simultaneously for ease of handling.

11. The system according to claim 10, in which the sheet is provided with partially cut through divisions between the flanges to facilitate separation of the individual trays for insertion into the containers.

12. The system according to claim 11 further comprising a hanging tab extending upward from the top of one the rear portion or the front portion and an easy-opening flap extending upward from the top of the other of the rear portion or the front portion, the tab and the flap positioned beside one another to thereby facilitate grasping to pull the front and rear portions apart.

* * * * *